(12) United States Patent
Toyooka

(10) Patent No.: US 9,933,694 B2
(45) Date of Patent: *Apr. 3, 2018

(54) PROJECTOR AND CONTROL METHOD THEREOF USING ROTATION INFORMATION FOR A PHOSPHOR DISC

(71) Applicant: SEIKO EPSON CORPORATION, Tokyo (JP)

(72) Inventor: Takashi Toyooka, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 110 days.

This patent is subject to a terminal disclaimer.

(21) Appl. No.: 15/049,664

(22) Filed: Feb. 22, 2016

(65) Prior Publication Data

US 2016/0170293 A1    Jun. 16, 2016

Related U.S. Application Data

(63) Continuation of application No. 13/606,719, filed on Sep. 7, 2012, now Pat. No. 9,304,382.

(30) Foreign Application Priority Data

Nov. 2, 2011   (JP) .................................. 2011-240920

(51) Int. Cl.
  *G03B 21/16*    (2006.01)
  *G03B 21/20*    (2006.01)
  (Continued)

(52) U.S. Cl.
  CPC ........ *G03B 21/2053* (2013.01); *F21S 10/007* (2013.01); *G02B 26/008* (2013.01);
  (Continued)

(58) Field of Classification Search
  CPC ... F21S 10/007; G02B 26/008; G03B 21/006; G03B 21/16; G03B 21/2033;
  (Continued)

(56) References Cited

U.S. PATENT DOCUMENTS 3,010,362 A    11/1961  Smith
9,304,382 B2 *  4/2016  Toyooka ................ G03B 21/16
  (Continued)

FOREIGN PATENT DOCUMENTS

CN     102053468 A    5/2011
JP     2002-214699 A  7/2002
  (Continued)

*Primary Examiner* — Sultan Chowdhury
*Assistant Examiner* — Magda Cruz
(74) *Attorney, Agent, or Firm* — Oliff PLC

(57) ABSTRACT

A projector is provided which can secure long-term reliability and enable high-speed start-up through suppression of local heat generation of phosphor. The projector includes a light source device including an excitation light source emitting excitation light, a phosphor disk on which a phosphor that converts the excitation light into fluorescence is continuously formed in a circumferential direction of the phosphor disk, a motor unit rotating the phosphor disk in the circumferential direction, a light modulation device generating an image light through modulation of light including the fluorescence, and a projection optical system projecting the image light. If the number of rotations of the phosphor disk reaches a predetermined number that is smaller than a target number, the excitation light source is turned on, while if the number of rotations of the phosphor disk is increased after reaching the predetermined number, an output of the excitation light source is increased.

10 Claims, 5 Drawing Sheets

(51) Int. Cl.
  *G02B 26/00* (2006.01)
  *H04N 9/31* (2006.01)
  *F21S 10/00* (2006.01)
  *G03B 21/00* (2006.01)

(52) U.S. Cl.
  CPC ........... *G03B 21/006* (2013.01); *G03B 21/16* (2013.01); *G03B 21/204* (2013.01); *G03B 21/2033* (2013.01); *H04N 9/3114* (2013.01); *H04N 9/3155* (2013.01); *H04N 9/3197* (2013.01)

(58) Field of Classification Search
  CPC  G03B 21/204; G03B 21/2053; H04N 9/3114; H04N 9/3155; H04N 9/3197
  See application file for complete search history.

(56) References Cited

U.S. PATENT DOCUMENTS

2009/0284148 A1  11/2009  Iwanaga
2011/0043764 A1   2/2011  Narikawa
2011/0043765 A1   2/2011  Shibasaki
2011/0096296 A1   4/2011  Ogawa
2011/0096300 A1*  4/2011  Shibasaki .......... G03B 21/2013
                                                              353/85
2011/0228232 A1   9/2011  Sakata et al.
2011/0242502 A1  10/2011  Shibasaki
2012/0223760 A1   9/2012  Uchino et al.
2014/0152964 A1   6/2014  Sakata et al.

FOREIGN PATENT DOCUMENTS

| | | |
|---|---|---|
| JP | 2011-044367 A | 3/2011 |
| JP | 2011-095391 A | 5/2011 |
| JP | 2011-128340   | 6/2011 |
| JP | 2011-158726 A | 8/2011 |
| JP | 2011-197212 A | 10/2011 |
| JP | 2011-209555 A | 10/2011 |
| JP | 2011-215332 A | 10/2011 |

* cited by examiner

PROJECTOR AND CONTROL METHOD THEREOF USING ROTATION INFORMATION FOR A PHOSPHOR DISC

CROSS-REFERENCE TO RELATED APPLICATIONS

This is a Continuation of application Ser. No. 13/606,719 filed Sep. 7, 2012, which claims priority to Japanese Patent Application No. 2011-240920, filed Nov. 2, 2011. The disclosures of the prior applications are hereby incorporated by reference herein in their entirety.

BACKGROUND

1. Technical Field

The present invention relates to a projector and a control method thereof.

2. Related Art

In the related art, a projector has been proposed which uses solid-state light sources such as LEDs (Light Emitting Diodes) and LDs (Laser Diodes) and has the characteristics of small size, low power consumption, and long lifespan. Further, there is a projector which has a light source device in which solid-state light sources and phosphor are combined to attempt to realize the above-described characteristics (for example, see JP-A-2011-128340).

However, the above-described phosphor have the problems that the conversion efficiency and long-term reliability deteriorate due to heat generation, and a technology to prevent local heat generation through rotation of the phosphor is known.

However, in the case where the structure to rotate the phosphor as described above is adopted, time is needed until the phosphor reach a desired number of rotations, and thus time is needed until the solid-state light sources are turned on, that is, time is needed for the start-up of the projector.

SUMMARY

An advantage of some aspects of the invention is to provide a projector that can secure long-term reliability and enable high-speed start-up through suppression of local heat generation of phosphor.

An aspect of the invention is directed to a projector, which includes a light source device including at least one excitation light source emitting excitation light; a phosphor disk on which a phosphor that converts the excitation light into fluorescence is continuously formed in a circumferential direction of the phosphor disk; a motor unit rotating the phosphor disk in the circumferential direction around an axis that runs through a center of the phosphor disk; a light modulation device generating an image light through modulation of light including at least the fluorescence; and a projection optical system projecting the image light, wherein if the number of rotations of the phosphor disk reaches a predetermined number that is smaller than a target number, the excitation light source is turned on, while if the number of rotations of the phosphor disk is increased after reaching the predetermined number, an output of the excitation light source is increased.

According to the projector of the aspect of the invention, since a solid-state light source is turned on at a timing when the number of rotations of the phosphor disk reaches the predetermined number that is smaller than the target number during a start-up of driving of the light source device, an image can be quickly displayed, and time to keep a user waiting during a start-up of the projector can be shortened. Further, since the output of the solid-state light source is increased according to the increase of the number of rotations of the phosphor disk after turning on of the solid-state light source, the light quantity of the solid-state light source is suppressed in a stage where the number of rotations of the phosphor disk is small. Accordingly, deterioration of the phosphor with the high output excitation light being irradiated onto the phosphor disk having a small number of rotations can be suppressed.

Accordingly, it becomes possible to provide a projector that can secure long-term reliability of the phosphor and realize high-speed start-up.

It is preferable that the output of the control unit is increased as an input power to the excitation light source is increased.

According to this configuration, the increase of the output of the solid-state light source can be simply and reliably performed since the input power is increased.

It is preferable that the output of the excitation light source is increased based on a lookup table in which the relationship between an elapsed time after the number of rotations of the phosphor disk reaches the predetermined number and the number of rotations of the phosphor disk be predetermined.

According to this configuration, by using the predetermined lookup table, the number of rotations of the phosphor disk can be easily acquired based on the elapsed time after the number of rotations of the phosphor disk reaches the predetermined number.

It is preferable that the number of rotations of the phosphor disk is detected from the motor unit, and the output of the excitation light source is increased according to the result of the detection.

According to this configuration, since the number of rotations of the phosphor disk can be acquired at any time from the motor unit, the output control of the solid-state light source can be performed with high precision.

It is preferable that the timing when the number of rotations of the phosphor disk reaches the target number is earlier than or substantially the same as a timing when the input power to the excitation light source reaches a target value.

According to this configuration, since the timing when the number of rotations of the phosphor disk is saturated becomes earlier than or substantially the same as the timing when the input power to the excitation light source is saturated, the fluorescence can be stably generated.

It is preferable that the excitation light source is driven by a pulse controlled by a pulse width modulation, and a pulse width modulation frequency of the excitation light source be equal to or more than three times and be a non-integral multiple of a frequency of the phosphor disk.

According to this configuration, flickering is prevented from occurring due to interference between driving frequencies of the solid-state light source and the phosphor disk.

It is preferable that the light source device includes a solid-state light source that emits light forming white light together with the fluorescence, and the solid-state light source is turned on along with the turning on of the excitation light source.

According to this configuration, since the driving of the light source device is controlled by the control unit to keep a white balance, it is possible to provide a projector with high reliability which can obtain the bright and clear image light.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the accompanying drawings. The embodiment shows one aspect of the invention, but the invention is not limited thereto, and may be optionally modified within the range of technical ideas of the invention. In the following drawings, to make each configuration plain, a reduced scale or numbers in the real structure may differ.
First Embodiment FIG. 1 is a schematic view schematically illustrating the overall configuration of a projector according to a first embodiment.

Figure 1:
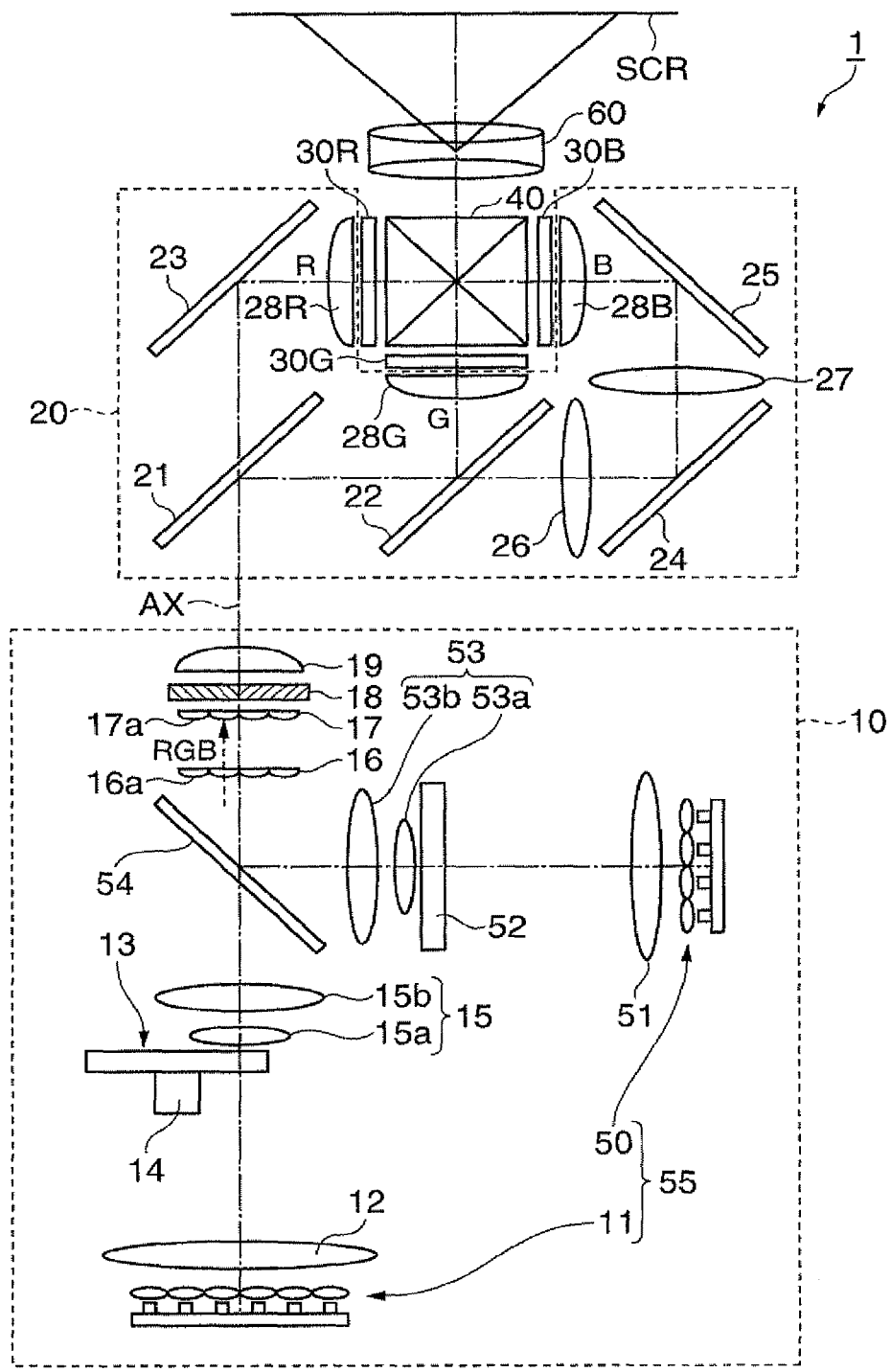
FIG. 1 is a schematic view schematically illustrating the overall configuration of a projector according to a first embodiment.

As illustrated in FIG. 1, a projector 1 includes an illumination device 10, a color separation light guide optical system 20, liquid crystal light modulation devices 30R, 30G, and 30B (light modulation devices), a cross dichroic prism 40, and a projection optical system 60. The projector 1 displays an image on a screen SCR by projecting an image light according to an image signal input from an outside toward the screen SCR.

The illumination device 10 includes a light source device 55 having a first light source (excitation light source) 11 and a second light source (solid-state light source) 50, condensing lenses 12 and 51, a rotary phosphor plate (phosphor disk) 13, a motor (motor unit) 14, a diffusion plate 52, collimator optical systems 15 and 53, a beam splitter 54, a first lens array 16, a second lens array 17, a polarization conversion element 18, and a superposition lens 19.

As the first light source 11 or the second light source 50, a semiconductor laser array having a plurality of semiconductor laser elements each of which is arranged in an aspect form may be used. By using the plurality of semiconductor laser elements as described above, high output blue light can be obtained. It is exemplified that the first light source 11 and the second light source 50 emit blue light with a peak emission intensity of 445 nm. However, unlike this, the light sources may have a different peak of emission intensity (for example, about 460 nm).

The condensing lens 12 is installed on a light path between the first light source 11 and the rotary phosphor plate 13 to condense the blue light emitted from the first light source 11 at a position around the rotary phosphor plate 13.

The rotary phosphor plate 13 is to convert the blue light, which is an excitation light condensed by the condensing lens 12, into a yellow light (fluorescence) including a red light and a green light, and is rotatably supported by the motor 14.

Figure 2A:
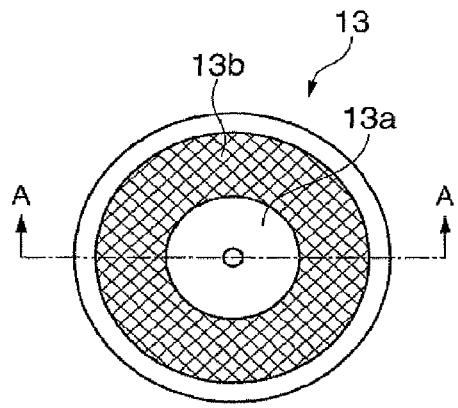
FIGS. 2A and 2B are views illustrating the configuration of a rotary phosphor plate installed in the projector according to the first embodiment.
Figure 2B:
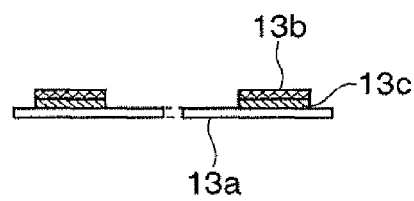

FIGS. 2A and 2B are views illustrating the configuration of the rotary phosphor plate 13 installed in the projector according to this embodiment. FIG. 2A is a front view, and FIG. 2B is a cross-sectional arrow view along line A-A of FIG. 2A. As illustrated in FIGS. 2A and 2B, the rotary phosphor plate 13 is provided by continuously forming a phosphor 13b, which is a single phosphor layer, on one surface of a transparent disk 13a in the circumferential direction of the disk 13a.

The disk 13a is formed using a material, for example, such as quartz glass, crystal, sapphire, optical glass, and transparent resin, which transmits blue color light. In the center portion of the disk 13a, holes between which a rotating shaft of the motor 14 is inserted are formed. The phosphor 13b transmits the blue light from the first light source 11 in a state where it has converted the blue light into a yellow light (fluorescence) including a red color and a green color. The phosphor 13b may contain, for example, YAG series phosphor (Y, Gd)3(Al, Ga)5O12:Ce. As illustrated in FIG. 2B, the phosphor 13b is formed on one surface of the disk 13a through a dichroic film 13c that transmits the blue light and reflects the red light and the green light.

The rotary phosphor plate 13 has a surface on which the phosphor 13b is formed and which is arranged toward the opposite side to the side on which the blue light is incident so that the blue light from the first light source 11 is incident from the side of the disk 13a to the phosphor 13b. Further, the rotary phosphor plate 13 is driven by the motor 14 to be rotated, and is arranged around the condensing position of the condensing lens 12 so that the blue light is constantly incident to an area in which the phosphor 13b is formed.

The rotary phosphor plate 13 is rotated, for example, at 5000 rpm by the motor 14 in a normal state. Here, the diameter of the rotary phosphor plate 13 is 50 mm, and the incident position of the blue light that is condensed by the condensing lens 12 to the rotary phosphor plate 13 is set to a position that is apart for about 22.5 mm from the rotation center of the rotary phosphor plate 13. That is, the rotary phosphor plate 13 is rotated by the motor 14 at a rotating speed at which a condensing spot of the blue light moves over the phosphor 13b at about 12 m/sec.

Referring again to FIG. 1, the collimator optical system 15 includes a first lens 15a and a second lens 15b, and approximately parallelizes the light from the rotary phosphor plate 13. The condensing lens 51 is arranged on a light path between the second light source 50 and the diffusion plate 52 to condense the blue light emitted from the second light source 50 at a position around the diffusion plate 52. The blue light diffused to the diffusion plate 52 is approximately parallelized by the collimator optical system 53. The collimator optical system 53 includes a first lens 53a and a second lens 53b.

The beam splitter 54 transmits the fluorescence generated by the rotary phosphor plate 13 and reflects the blue light emitted from the second light source 50. Through this, the fluorescence through the rotary phosphor plate 13 and the blue light emitted from the second light source 50 are synthesized with each other to generate a white light that includes the red light, the green light, and the blue light. The white light is incident to the first lens array 16.

The first lens array 16 includes a plurality of small lenses 16a, and divides the white light into a plurality of partial light fluxes. Specifically, the plurality of small lenses 16a of the first lens array 16 are arranged in a matrix shape in which a plurality of rows and a plurality of columns are provided within a surface that is orthogonal to an illumination light axis AX. Further, the external shapes of the plurality of small lenses 16a of the first lens array 16 are substantially similar to the external shapes of image forming areas of the liquid crystal light modulation devices 30R, 30G, and 30B.

The second lens array 17 includes a plurality of small lenses 17a that correspond to the plurality of small lenses 16a installed in the first lens array 16. That is, the plurality of small lenses 17a of the second lens array 17 are arranged, in the same manner as the plurality of small lenses 16a of the first lens array 16, in a matrix shape in which a plurality of rows and a plurality of columns are provided within the surface that is orthogonal to the illumination light axis AX. This second lens array 17, together with the superposition lens 19, forms images of the respective small lenses 16a of the first lens array 16 around the image forming areas of the liquid crystal light modulation devices 30R, 30G, and 30B.

The polarization conversion element 18 includes a polarization separation layer, a reflective layer, and a phase difference plate (all not illustrated), and emits approximately one kind of linear polarization light that is parallel to the polarization direction of each partial light flux divided by the first lens array 16. Here, the polarization separation layer transmits one linear polarization component of polarization components included in the white light as it is, and reflects the other linear polarization component in a direction that is perpendicular to the illumination light axis AX. Further, the reflective layer reflects the other linear polarization component that is reflected by the polarization separation layer in a direction that is parallel to the illumination light axis AX. Further, the phase difference plate converts the other linear polarization component reflected by the reflective layer into the one linear polarization component.

The superposition lens 19 is arranged so that its optical axis coincides with the light axis of the illumination device 10, and condenses and superimposes each partial light flux from the polarization conversion element 18 on the neighborhood of the image forming areas of the liquid crystal light modulation devices 30R, 30G, and 30B. The first lens array 16, the second lens array 17, and the superposition lens 19 constitute a lens integrator optical system that equalizes the light from the first light source 11.

The color separation light guide optical system 20 includes dichroic mirrors 21 and 22, reflection mirrors 23 to 25, relay lenses 26 and 27, and condensing lenses 28R, 28G, and 28B. The color separation light guide optical system 20 separates the light from the illumination device 10 into a red light, a green light, and a blue light, and guides the separated lights to the liquid crystal light modulation devices 30R, 30G, and 30B. The dichroic mirrors 21 and 22 are mirrors in which a wavelength selectively permeable film, which reflects light of a predetermined wavelength region and transmits light of other wavelength regions, is formed on a transparent substrate. Specifically, the dichroic mirror 21 transmits a red light component and reflects a green light component and a blue light component, and the dichroic mirror 22 reflects the green light component and transmits the blue light component.

The reflection mirror 23 is a mirror that reflects the red light component, and the reflection mirrors 24 and 25 are mirrors that reflect the blue light component. The relay lens 26 is arranged between the dichroic mirror 22 and the reflection mirror 24, and the relay lens 27 is arranged between the reflection mirror 24 and the reflection mirror 25.

The relay lenses 26 and 27 are installed to prevent deterioration of the utilization efficiency of light due to light emission or the like since the length of a light path of the blue light is longer than the length of light paths of other color lights. The condensing lenses 28R, 28G, and 28B directly guide the red light component reflected by the reflection mirror 23, the green light component reflected by the dichroic mirror 22, and the blue light component reflected by the reflection mirror 25 to the image forming areas of the liquid crystal light modulation devices 30R, 30G, and 30B, respectively.

The red light that passes through the dichroic mirror 21 is reflected by the reflection mirror 23, and is incident to the image forming area of the liquid crystal light modulation device 30R for the red light through the condensing lens 28R. The green light reflected by the dichroic mirror 21 is reflected by the dichroic mirror 22, and is incident to the image forming area of the liquid crystal light modulation device 30G for the green color through the condensing lens 28G. The blue light that is reflected by the dichroic mirror 21 and passes through the dichroic mirror 22 passes through the relay lens 26, the reflection mirror 24, the relay lens 27, the reflection mirror 25, and the condensing lens 28B in order, and is incident to the image forming area of the liquid crystal light modulation device 30B for the blue color.

The liquid crystal light modulation devices 30R, 30B, and 30B modulate incident color lights according to an image signal input from an outside and generate a red image light, a green image light, and a blue image light, respectively. Although not illustrated in FIG. 1, incident side polarization plates are interposed between the condensing lenses 28R, 28G, and 28B and the liquid crystal light modulation devices 30R, 30G, and 30B, respectively, and emission side polarization plates are interposed between the liquid crystal light modulation devices 30R, 30G, and 30B and a cross dichroic prism 40.

The liquid crystal light modulation devices 30R, 30G, and 30B are transmission type liquid crystal light modulation devices in which liquid crystals that are electro-optic materials are sealed up and enclosed between a pair of transparent glass substrates, and, for example, are provided with polysilicon TFTs (Thin Film Transistors) as switching elements. Since the polarization direction of the color light (linear polarization light) through the above-described incident side polarization plate (not illustrated) is modulated by the switching operation of the switching elements installed in the liquid crystal light modulation devices 30R, 30G, and 30B, the red image light, the green image light, and the blue image light are generated according to the image signal.

The cross dichroic prism 40 synthesizes the image lights emitted from the emission side polarization plates (not illustrated) to form a color image. Specifically, the cross dichroic prism 40 is a substantially cubic optical member formed by bonding four rectangular prisms, and on an interface of a substantially "X" shape through bonding of the rectangular prisms, a dielectric multilayer is formed. The dielectric multilayer formed on one interface of a substantially "X" shape reflects the red light, and the dielectric multilayer formed on the other interface reflects the blue light. Since the red light and the blue light are bent by the dielectric multilayer and are in parallel to the traveling direction of the green light, three color lights are synthesized. The projection optical system 50 expands and projects the color image that is synthesized through the cross dichroic prism 40 toward the screen SCR.

Figure 3:
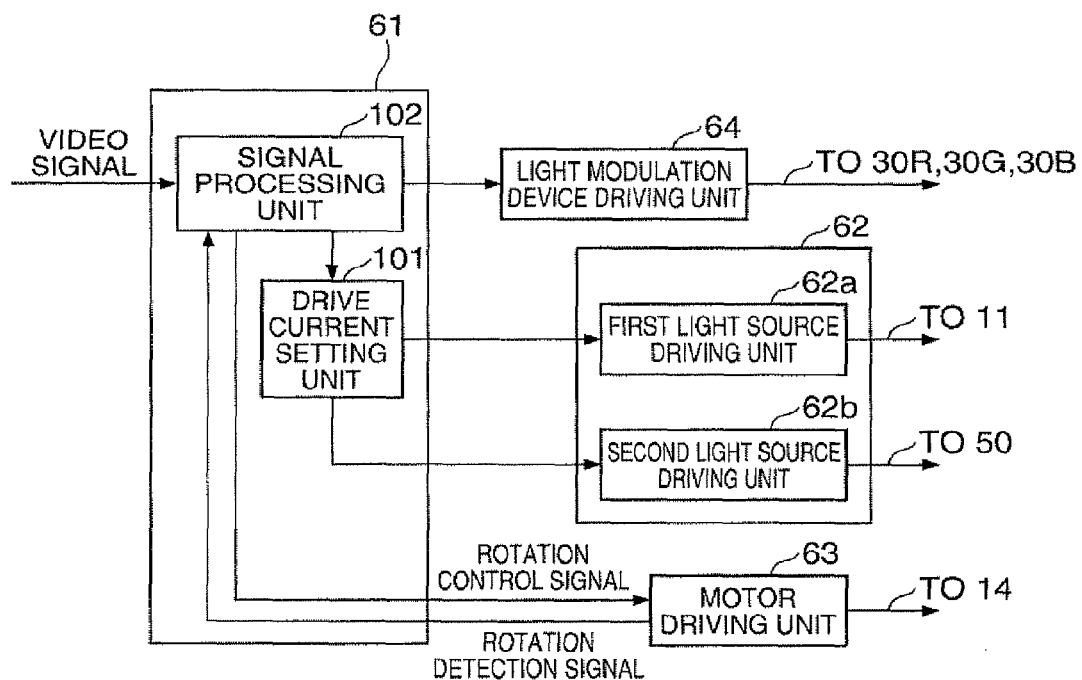
FIG. 3 is a block diagram illustrating the configuration of main portions of a control system of the projector according to the first embodiment.

Then, the operation of the projector 1 will be described. FIG. 3 is a block diagram illustrating the configuration of main portions of a control system of the projector 1 according to this embodiment. In FIG. 3, only the members which are necessary for explanation are extracted from the members illustrated in FIG. 1, simplified, and illustrated.

As illustrated in FIG. 3, the projector 1 includes a control unit 61, a light source driving unit 62, a motor driving unit 63, and a light modulation device driving unit 64. The light source driving unit 62 includes a first light source driving unit 62a that drives the first light source 11 and a second light driving unit 62b that drives the second light source 50.

The control unit 61 is realized to include a CPU (Central Processing Unit), a ROM (Read Only Memory), and a RAM (Random Access Memory) (all not illustrated). The CPU reads a control program stored in the ROM, develops the read control program into the RAM, and executes steps of the program on the RAM. As the CPU executes the program, the control unit 61 controls the overall operation of the projector 1.

The control unit 61 includes a drive current setting unit 101 and a signal processing unit 102.

The drive current setting unit 101 generates a signal (hereinafter referred to as a "drive current setting signal") for setting a drive current of the first light source 11 and the second light source 50, and supplies the generated signal to the light source driving unit 62 (the first light source driving unit 62a and the second light source driving unit 62b). The first light source driving unit 62a drives the first light source 11 based on the drive current setting signal, and emits the blue light from the first light source 11. The second light source driving unit 62b drives the second light source 50 based on the drive current setting signal, and emits the blue light from the second light source 50. As described above, the drive current setting unit 101 controls input power to the first light source 11 and the second light source 50 through control of the drive current setting signal that is supplied to the light source driving unit 62, and controls the output (light quantity) of the blue light emitted by the first light source 11 and the second light source 50.

The signal processing unit 102 supplies a rotation control signal for rotating the motor 14 to the motor driving unit 63. The signal processing unit 102 detects the real number of rotations of the motor 14 (rotary phosphor plate 13) according to the rotation detection signal of the motor 14 that is supplied from the motor driving unit 63. Further, the signal processing unit 102 supplies a rotation number detection signal for the detected number of rotations of the motor 14 to the drive current setting unit 101. Through this, the drive current setting unit 101 controls the input power to the first light source 11 and the second light source 50 according to the number of rotations of the motor 14 (rotary phosphor plate 13), and controls the outputs of the light sources.

To the signal processing unit 102, a video signal is input from an external device such as a computer, a DVD player, or a TV tuner. The signal processing unit 102, for example, performs image resizing, gamma correction, color adjustment, and the like, through characteristic correction and amplification of the video signal, and separates the video signal into video data of R, G, and B. Further, the signal processing unit 102 generates a light modulation signal for driving the liquid crystal light modulation devices 30R, 30G, and 30B (light modulation devices) for the respective color lights, and transmits the light modulation signal to the light modulation device driving unit 64.

The light modulation device driving unit 64 drives the liquid crystal light modulation devices 30R, 30G, and 30B based on the light modulation signal transmitted from the signal processing unit 102. Specifically, the light modulation device driving unit 64 drives the liquid crystal light modulation device 30R for the red light according to the light modulation signal for the red color, drives the liquid crystal light modulation device 30G for the green light according to the light modulation signal for the green color, and drives the liquid crystal light modulation device 30B for the blue light according to the light modulation signal for the blue color.

Figure 4:
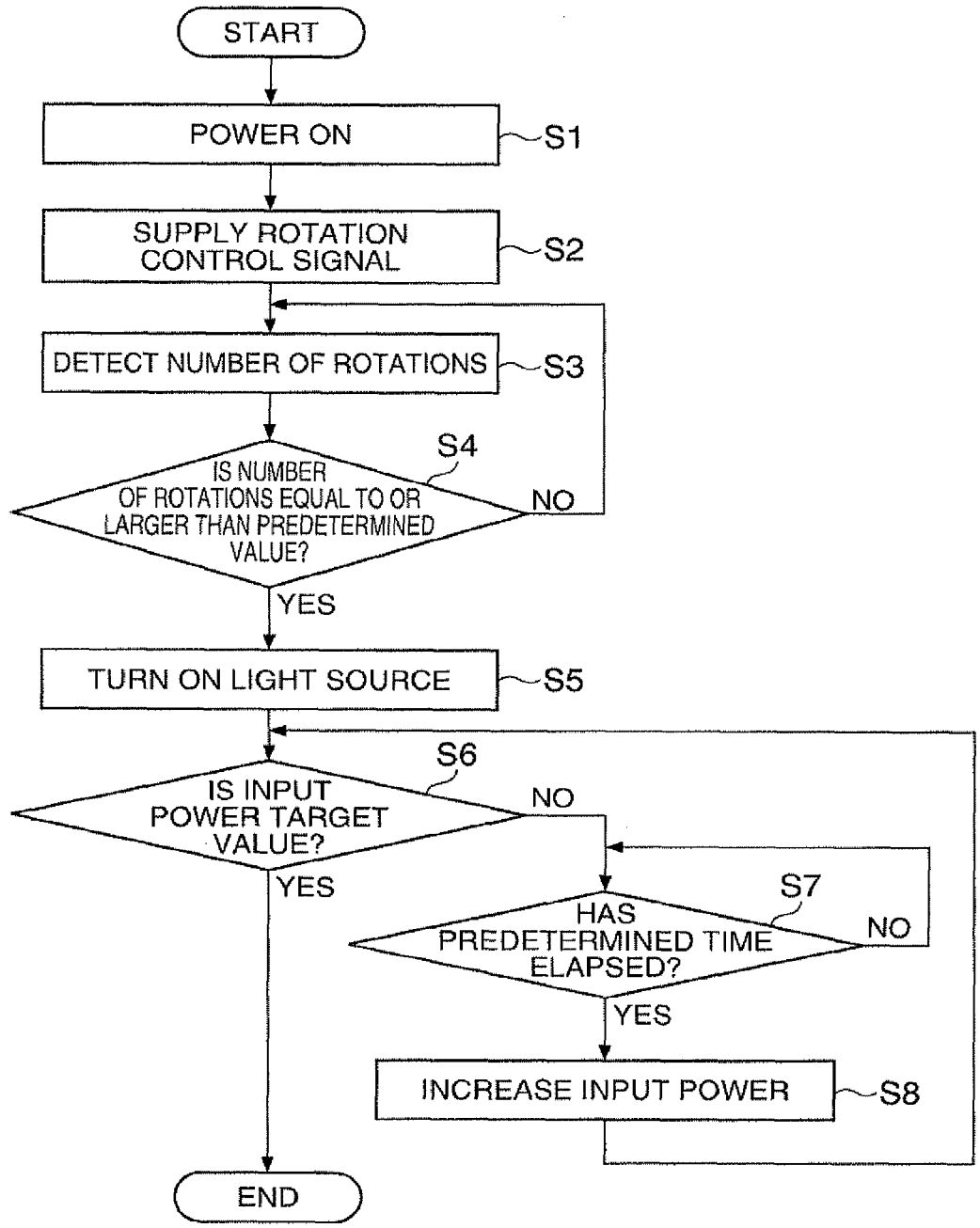
FIG. 4 is a flowchart illustrating a processing order of a control system of the projector according to the first embodiment.

Then, the control of the above-described projector 1 will be described. FIG. 4 is a flowchart illustrating the processing order of a control system of the projector 1 according to this embodiment, and illustrates the processing order during a start-up of the projector 1.

When power of the projector 1 becomes in an ON state (step S1), the signal processing unit 102 of the control unit 61 supplies the rotation control signal to the motor driving unit 63 (step S2). As the motor driving unit 63 drives the motor 14, the rotary phosphor plate 13 starts rotating.

The signal processing unit 102 detects the number of rotations of the motor 14 based on the rotation detection signal that is supplied from the motor driving unit 63 (step S3), and determines whether or not the number of rotations of the motor 14 reaches a predetermined number (step S4). The detection of the number of rotations is performed until the number of rotations of the motor 14 reaches the predetermined number.

The predetermined number of rotations of the motor 14 is, for example, 1000 rpm. This predetermined number is smaller than 5000 rpm that is a target number of rotations of the motor 14. The target number of rotations is the number of rotations of the rotary phosphor plate 13 (motor 14) when the driving of the illumination device 10 has been stabilized.

If the signal processing unit 102 detects that the number of rotations of the motor 14 reaches the predetermined number ("Yes"), the control unit 61 supplies a rotation number detection signal to the drive current setting unit 101. The drive current setting unit 101 supplies the drive current setting signal of the first light source 11 and the second light source 50 to the light source driving unit 62 (the first light source driving unit 62a and the second light source driving unit 62b) based on the rotation number detection signal. The first light source driving unit 62a drives the first light source 11 with a predetermined input power that is lower than a target input power based on the drive current setting signal, and turns on the first light source 11 with a predetermined output that is lower than a target output (step S5). The number of rotations of the motor 14 is increased toward the target number after reaching the predetermined number.

The target output is, for example, a light quantity (target value of the output) of 3000 lm that is obtained when current of 1.2 A, which is the target input power (target value of the input power), is input to the first light source 11. The target output is an output of the first light source 11 when the driving of the illumination device 10 has been stabilized.

The predetermined output is, for example, a light quantity (predetermined value of the output) of 800 lm that is obtained when current of 0.8 A, which is the predetermined input power (predetermined value of the input power), is input to the first light source 11.

Then, the control unit 61 determines whether or not the input power to the first light source 11 reaches the target value (step S6). If the input power to the first light source 11 reaches the target value ("Yes"), the processing procedure at the start-up of the projector 1 is terminated.

After the termination of the processing procedure, the motor 14 is rotated at 5000 rmp that is the target number of rotations, and the first light source 11 outputs 3000 lm that is the target value of the output (light quantity).

If the input power to the first light source 11 does not reach the target value ("No"), the control unit 61 determines whether or not a predetermined time has elapsed after the number of rotations of the rotary phosphor plate 13 reaches the predetermined number (step S7). If it is determined that the predetermined time has elapsed ("Yes"), the control unit 61 increases the input power to the first light source 11 (step S8).

The determination of whether or not the predetermined time has elapsed (step S7) and the increase of the input power (step S8) are repeatedly performed until it is determined that the input power to the first light source 11 reaches the target value (step S6).

Hereinafter, the increase of the input power to the first light source 11 (step S8) will be described.

In this embodiment, the output of the first light source 11 is increased using a lookup table calculated in advance. In this lookup table, the relationship between the elapsed time after the number of rotations of the rotary phosphor plate reaches the predetermined number and the number of rotations of the rotary phosphor plate 13 (motor 14) has been evaluated in advance. Accordingly, the control unit 61 acquires information on the number of rotations of the rotary phosphor plate 13 that corresponds to the elapsed time after the number of rotations of the rotary phosphor plate 13 reaches the predetermined number with reference to the lookup table. Using the lookup table, it is not necessary for the control unit 61 to constantly manage the number of rotations of the rotary phosphor plate 13 (motor 14), but it is sufficient if the time when the number of rotations of the rotary phosphor plate 13 reaches the predetermined number is managed. Accordingly, the control of the control unit 61 after the first light source 11 is turned on can be simplified.

The control unit 61 increases the input power to the first light source 11 to correspond to the number of rotations acquired from the lookup table at step S8. Specifically, the drive current setting unit 101 supplies the drive current setting signal of the first light source 11 to the light source driving unit 62. Through this, the first light source driving unit 62a increases the input power to the first light source 11 based on the drive current setting signal to increase the output of the blue light.

Figure 5A:
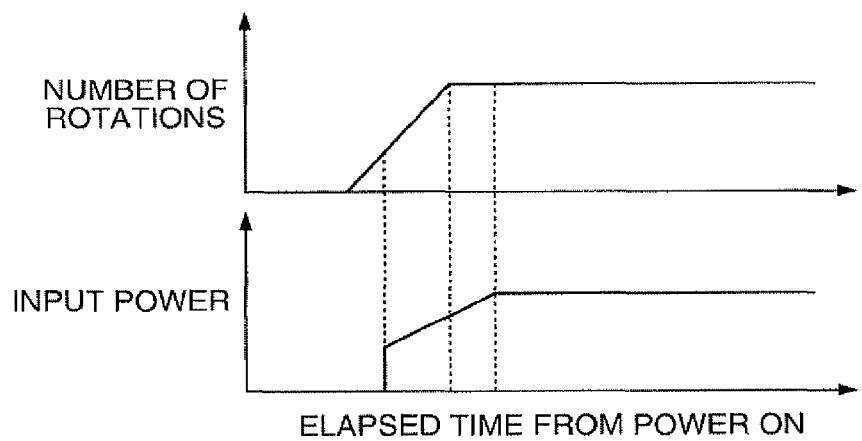
FIGS. 5A to 5c are diagrams illustrating input power to a light source driving unit according to the first embodiment.
Figure 5B:
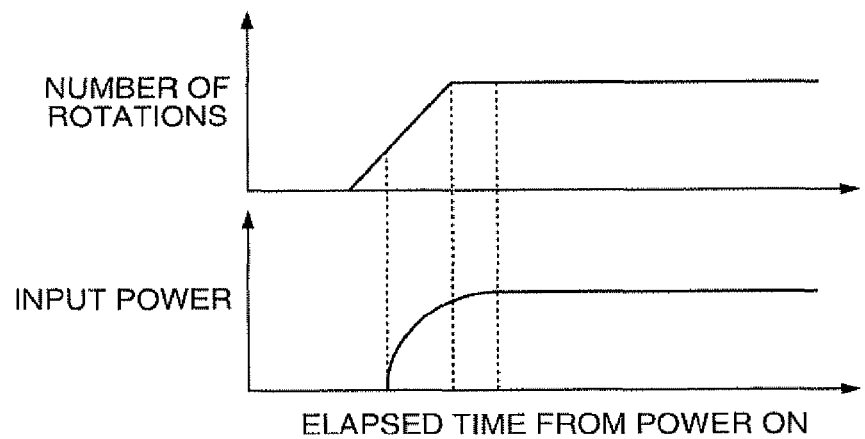
Figure 5C:
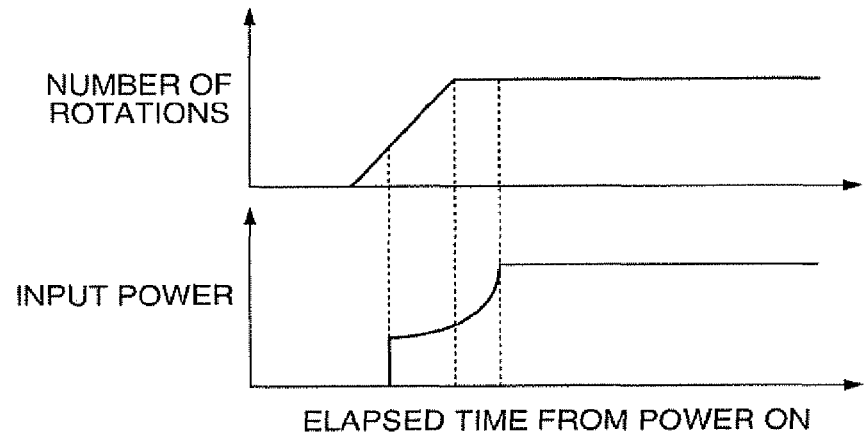

FIGS. 5A to 5C are diagrams illustrating the input power to the light source driving unit according to the first embodiment.

It is preferable that the control unit 61 increases the output (light quantity) of the first light source 11 to maintain the change rate within 2% per unit time (15 to 30 ms). Through this, the brightness of the first light source 11 can be smoothly changed, and deterioration of the quality of the display image due to flickering and the like can be prevented. For example, the control unit 61 controls the input power to the first light source 11 to be linearly increased as illustrated in FIG. 5A. Further, the control unit 61 controls the input power to the first light source 11 to be convex upwardly as illustrated in FIG. 5B.

When the output (light quantity) of the first light source 11 is increased, the exhaust heat rate of the first light source 11 may be considered. If the exhaust heat rate of the first light source 11 is increased, the conversion efficiency of the phosphor 13b is lowered. Because of this, the input power to the first light source 11 is controlled to be convex downwardly as illustrated in FIG. 5C.

The control unit 61 controls the first light source 11 so that the timing when the number of rotations of the rotary phosphor plate 13 reaches the target number is earlier than or substantially the same as the timing when the output of the first light source 11 reaches the target value. Through this, since the output of the first light source 11 reaches the target value in a state where the rotary phosphor plate 13 is stably rotated with the target number, the blue light is stably incident to the phosphor 13b of the rotary phosphor plate 13, and thus the yellow light can be efficiently generated.

In this embodiment, by turning on the first light source 11 and the second light source 50 at a time when the number of rotations of the motor 14 that rotates the rotary phosphor plate 13 reaches the predetermined number of 1000 rpm, which is smaller than the target number of 5000 rpm, the image can be rapidly displayed. Accordingly, inconvenience to keep a user waiting for a long time in a state where the image is not displayed until the number of rotations of the motor 14 reaches the target number is prevented from occurring.

In this embodiment, with the increase of the number of rotations of the rotary phosphor plate 13 after the turning on of the first light source 11, the output of the first light source 11 is increased. Through this, the heat generation of the phosphor 13b due to the irradiation of the excitation light having high output onto the rotary phosphor plate 13 having a small number of rotations can be prevented. By suppressing the heat generation of the phosphor 13b, the lifespan of the phosphor 13b is extended, and the long-term reliability of the phosphor 13b can be secured.

In this embodiment, a case where the first light source 11 is turned on at step S5 and the input power to the first light source 11 is increased at step S8 has been described.

However, at step S5, the second light source driving unit 62b may turn on the second light source 50 together with the turning on of the first light source 11. Through this, a white light is incident to the first lens array 16, and the illumination device 10 drives the projector 1 to emit the white light of a good white balance just after the illumination device 10 starts the turning on.

At step S8, in addition to the increase of the input power to the first light source 11, the input power to the second light source 50 may be increased in the same manner. The control unit 61 increases the input power to the second light source 50 to maintain the white balance of the white light.

In this embodiment, it has been described that the number of rotations of the motor 14 is acquired using the lookup table. However, the control unit 61 may acquire in real time the increase of the number of rotations of the motor 14 through the signal processing unit 102 even after the turning on of the first light source 11, and may increase the input power to the first light source 11 to match the number of rotations. Through this, it is particularly effective in the case where a gap occurs between the number of rotations acquired from the lookup table and the real number of rotations of the motor 14 due to the change of the elapsed time or solid unevenness.

In this embodiment, it has been described that the timing when the number of rotations of the rotary phosphor plate 13 reaches the target number is earlier than or substantially the same as the timing when the output of the first light source 11 reaches the target value. However, the control unit 61 may adjust the timing to increase the output of the first light source 11 through controlling of the rotation of the motor 14.

Second Embodiment

Hereinafter, a projector according to a second embodiment will be described. The difference between this embodiment and the first embodiment is the configuration of the control system of the projector 1. Specifically, this embodiment is different from the first embodiment on the point that in this embodiment, the first light source 11 and the second light source 50 are pulse-driven, and the output of the first light source 11 and the second light source 50 are controlled by controlling the pulse width modulation duty. Since other configurations according to this embodiment are the same as those according to the first embodiment, the same reference numerals are given to the same members and configurations, and the detailed description thereof will be omitted or simplified.

Figure 6:
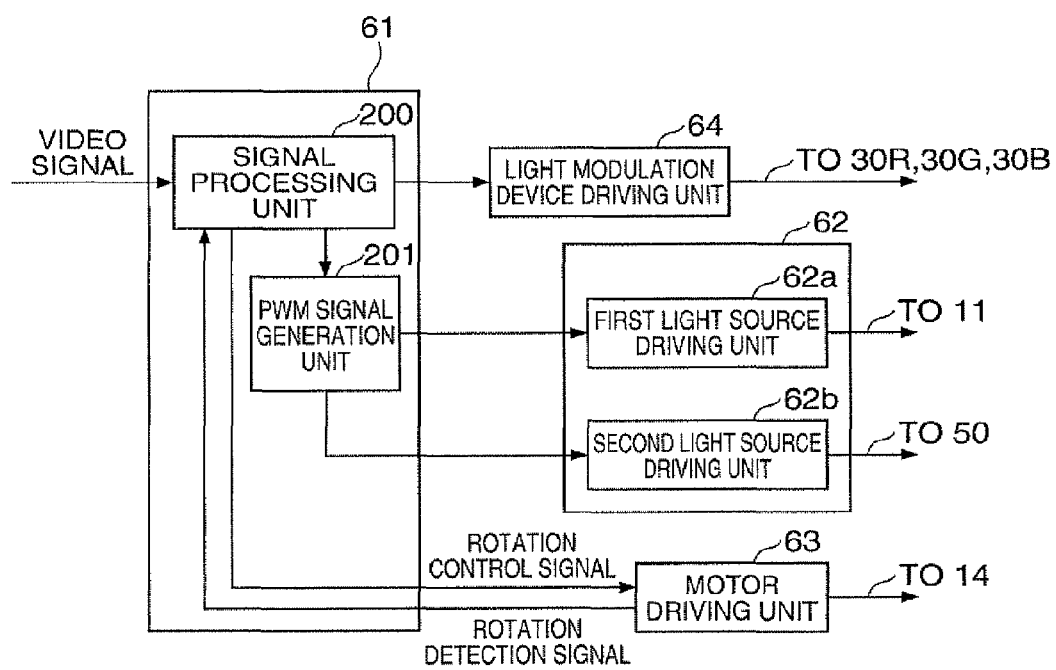
FIG. 6 is a block diagram illustrating the configuration of main portions of a control system of the projector according to a second embodiment.

FIG. 6 is a block diagram illustrating the configuration of main portions of the control system of the projector 1 according to this embodiment. In FIG. 6, only the members which are necessary for explanation are extracted from the members, simplified, and illustrated.

As illustrated in FIG. 6, the projector 1 includes a control unit 61, a light source driving unit 62, a motor driving unit 63, and a light modulation device driving unit 64. The light source driving unit 62 includes a first light source driving unit 62a that drives the first light source 11 and a second light driving unit 62b that drives the second light source 50.

The control unit 61 according to this embodiment includes a signal processing unit 200 and a PWM signal generation unit 201.

The signal processing unit 200 follows the rotation detection signal of the motor 14 that is supplied from the motor driving unit 63, and detects the number of rotations of the motor 14 (rotary phosphor plate 13) based on the rotation detection signal.

The PWM signal generation unit 201 generates information on the duty (hereinafter referred to as "duty information") of the first light source 11 and the second light source 50 that are driven by pulse width modulation so as to obtain the light quantity according to the number of rotations of the motor 14, and supplies the duty information to the light source driving unit 62. The light source driving unit 62 (the first light source driving unit 62a and the second light source driving unit 62b) pulse-drives the first light source 11 and the second light source 50 based on the duty information to make them emit the blue light.

To the signal processing unit 200, a video signal is input from an external device such as a computer, a DVD player, or a TV tuner. The signal processing unit 200, for example, performs image resizing, gamma correction, color adjustment, and the like, through characteristic correction and amplification of the video signal, and separates the video signal into video data of R, G, and B. Further, the signal processing unit 200 generates a light modulation signal for driving the liquid crystal light modulation devices 30R, 30G, and 30B (light modulation devices) for the respective color lights, and transmits the light modulation signal to the light modulation device driving unit 64.

The light modulation device driving unit 64 drives the liquid crystal light modulation devices 30R, 30G, and 30B based on the light modulation signal transmitted from the signal processing unit 200. Specifically, the light modulation device driving unit 64 drives the liquid crystal light modulation device 30R for the red light according to the light modulation signal for the red color, drives the liquid crystal light modulation device 30G for the green light according to the light modulation signal for the green color, and drives the liquid crystal light modulation device 30B for the blue light according to the light modulation signal for the blue color.

Further, the signal processing unit 200 considers the driving frequency of the first light source 11 and the second light source 50 as an integral multiple of the driving frequency of the light modulation device driving unit 64. Through this, noise is prevented from occurring due to the interference between the blue light that is intermittently emitted from the first light source 11 and the second light source 50 and the light modulation operation that is intermittently performed by the liquid crystal light modulation device 30R, 30G, and 30B.

The signal processing unit 200 supplies the rotation control signal for rotating the motor 14 to the motor driving unit 63, follows the rotation detection signal of the motor 14 that is supplied from the motor driving unit 63, and detects the real number of rotations of the motor 14 (rotary phosphor plate 13) based on the rotation detection signal. Through this, the signal processing unit 200 controls the output of the first light source 11 and the second light source 50 by controlling the duty of the signal that is supplied from the light source driving unit 62 to the first light source 11 and the second light source 50 which are pulse-driven according to the number of rotations of the motor 14 (rotary phosphor plate 13).

Further, the signal processing unit 200 drives the first light source 11 and the motor 14 so that the above-described driving frequency of the first light source 11 becomes equal to or more than three times the rotating frequency of the motor 14, and satisfies the relationship of the non-integral multiple. Through this, it is possible to make flickering less noticeable, which occurs due to the interference between the blue light that is intermittently emitted from the first light source 11 through the pulse driving and the rotating period of the rotary phosphor plate 13 that is rotated by the motor 14, and it is particularly effective in the case where the change of light quantity becomes great due to the rotation of the rotary phosphor plate 13 that is caused by the solid unevenness of the phosphor 13b.

The control unit 61 may increase the output of blue light that is emitted by the first light source 11, as a result, the light quantity per unit time, by increasing the duty of the pulse signal input to the light source driving unit 62 through the PWM signal generation unit 201.

According to this embodiment, the output of the first light source 11 can be increased by increasing the duty of the first light source 11 that the control unit 61 pulse-drives. Accordingly, in the same manner as the first embodiment, after the turning on of the first light source 11, the output of the first light source 11 is increased according to the increase of the number of rotations of the rotary phosphor plate 13. Through this, the local heat generation of the phosphor 13b can be suppressed, and thus it is possible to provide a projector that can secure the long-term reliability of the phosphor 13b and enable high-speed start-up.

Modified Examples

The present invention is not limited to the above-described embodiments, and appropriate modifications thereof can be made without departing from the gist of the invention. For example, the following modified examples become possible.

In the above described embodiments, the initial driving of the light source device at a start-up of the projector has been described. However, the present invention can be used when the light sources are returned from a state where the light sources are turned off and the rotary phosphor plate is stopped in addition to the start-up of the projector.

In the above-described embodiments, it is exemplified that the liquid crystal light modulation device is used as the light modulation device. However, the present invention is not limited thereto. A light modulation device that modulates the incident light according to an image signal or a light valve or micromirror type light modulation device, for example, DMD (Digital Micromirror Device) (trademark of Texas Instruments Incorporated) or LCOS (Liquid Crystal On Silicon), may also be used.

In the above-described embodiments, the configuration includes the excitation light source 11 emitting the blue light as an excitation light and the rotary phosphor plate 13 converting the blue light from the excitation light source 11 into a red light and a green light. However, the present invention is not limited thereto. For example, the configuration may include a solid-state light source emitting a purple light or a UV light as the excitation light and a rotary phosphor plate generating a color light including a red light, a green light, and a blue light from the purple light or the UV light.

In the above-described embodiments, a transmission type projector is exemplified as the projector. However, the present invention is not limited thereto. For example, the present invention can be applied to a reflection type projector. Here, the "transmission type" means that the light modulation device such as a transmission type liquid crystal display device transmits light, and the "reflection type" means that the light modulation device such as a reflection type liquid crystal display device reflects the light. Even in the case where the present invention is applied to the reflection type projector, the same effects as the transmission type projector can be obtained.

What is claimed is:

1. A projector comprising:
   a light source device including at least one excitation light source emitting excitation light;
   a phosphor disk on which a phosphor that converts the excitation light into fluorescence is formed in a circumferential direction of the phosphor disk;
   a motor unit rotating the phosphor disk in the circumferential direction of the phosphor disk;
   a light modulation device generating an image light through modulation of light including at least the fluorescence; and
   a projection optical system projecting the image light,
   wherein if the number of rotations of the phosphor disk reaches a predetermined number that is smaller than a target number, wherein the number of rotations is determined from a revolutions per minute (rpm) of the phosphor disk, the excitation light source is turned on, and if rpm of the phosphor disk is increased after reaching the predetermined number, an input power to the excitation light source is increased.

2. The projector according to claim 1, wherein the input power to the excitation light source is increased based on an elapsed time after the number of rotations of the phosphor disk reaches the predetermined number.

3. The projector according to claim 2, wherein the input power to the excitation light source is increased based on a lookup table in which a relationship between an elapsed time after the number of rotations of the phosphor disk reaches the predetermined number and the number of rotations of the phosphor disk is predetermined.

4. The projector according to claim 2, wherein the timing when the number of rotations of the phosphor disk reaches the target number is earlier than or substantially the same as a timing when the input power to the excitation light source reaches a target value.

5. The projector according to claim 1, wherein the number of rotations of the phosphor disk is detected from the motor unit, and the input power to the excitation light source is increased according to the result of the detection.

6. The projector according to claim 5, wherein the timing when the number of rotations of the phosphor disk reaches the target number is earlier than or substantially the same as a timing when the input power to the excitation light source reaches a target value.

7. The projector according to claim 1, wherein a timing when the number of rotations of the phosphor disk reaches the target number is earlier than or substantially the same as a timing when the input power to the excitation light source reaches a target value.

8. The projector according to claim 1, wherein the excitation light source is driven by a pulse controlled by a pulse width modulation, and
   a pulse width modulation frequency of the excitation light source is equal to or more than three times and is a non-integral multiple of a frequency of the phosphor disk.

9. The projector according to claim 1, wherein the light source device includes a solid-state light source that emits light forming white light together with the fluorescence, and
   the solid-state light source is turned on along with turning on of the excitation light source.

10. A method of controlling a projector including a light source device including at least one excitation light source emitting excitation light, a phosphor disk on which a phosphor that converts the excitation light into fluorescence is formed in a circumferential direction of the phosphor disk, a motor unit rotating the phosphor disk in the circumferential direction of the phosphor disk, a light modulation device generating an image light through modulation of light including at least the fluorescence, and a projection optical system projecting the image light, the method comprising:
   turning on the excitation light source if the number of rotations of the phosphor disk reaches a predetermined number that is smaller than a target number, wherein the number of rotations is determined from a revolutions per minute (rpm) of the phosphor disk; and
   increasing an input power to the excitation light source if the rpm of the phosphor disk is increased after reaching the predetermined number.

* * * * *